Dec. 12, 1967 H. WIEHN ET AL 3,357,083
METHOD OF MAKING WELDED TUBES HEAT
EXCHANGERS WITH INTEGRAL FINS
Filed April 6, 1965
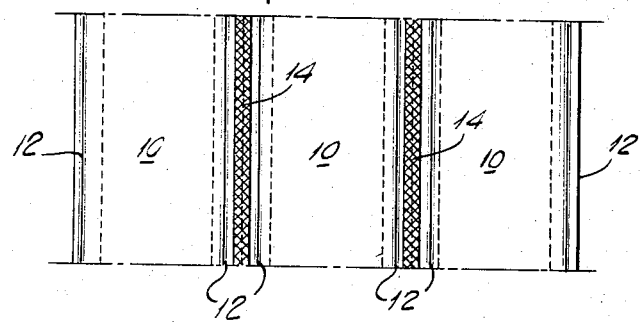
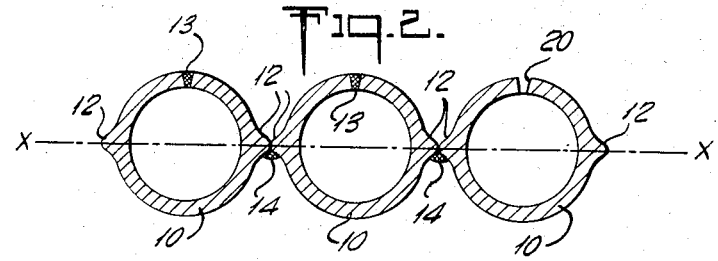
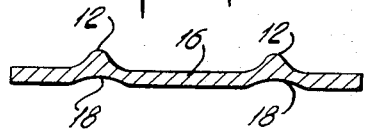
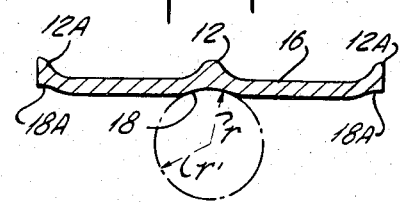
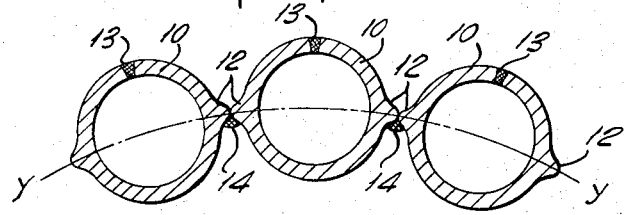
INVENTORS
HELMUT WIEHN
KARL ZECH
*J.P. Moran*
ATTORNEY

United States Patent Office 3,357,083
Patented Dec. 12, 1967

3,357,083
METHOD OF MAKING WELDED TUBES HEAT EXCHANGERS WITH INTEGRAL FINS
Helmut Wiehn and Karl Zech, Oberhausen, Rhineland, Germany, assignors to Babcock & Wilcox, Limited, London, England, a corporation of Great Britain
Filed Apr. 6, 1965, Ser. No. 445,981
2 Claims. (Cl. 29—157.3)

This invention relates to gas-tight tube panels or walls of the type used in tubular heat exchangers and comprising spaced parallel tubes formed with fins closing the intertube spaces and welded to each other, and more particularly to a novel method of making such a panel and to the articles produced by such method.

Integral gas-tight tube panels for use as components of tubular heat exchangers have been produced by various welding techniques. Heat exchanger components of this type have been used, for example, as combustion chamber walls, radiant heat absorption sections, and in gas passes.

As hitherto constructed, panels or panel walls of the character described have comprised spaced parallel seamless tubes formed with generally diametrically opposed longitudinally extending fins or ribs, with the longitudinal edges of adjacent fins of next adjacent tubes being juxtaposed and welded together throughout their lengths to form a rigid, gas-tight tubular panel. This system of tube panel construction has proven to be relatively expensive.

In accordance with the present invention, the costs of forming integral gas-tight tube panels or walls are greatly reduced. A gas-tight tube panel is provided by forming one surface of each of a plurality of metal strips with a pair of outwardly projecting wedge-shaped fins at positions spaced so that the fins will be generally diametrically opposed upon shaping of the strip into tubular form, then forming the opposite surface of each strip with an arc-shaped groove at the base of each fin, and then shaping each metal strip to generally tubular form with the fins on the outside and the edges of the strip closely opposed in a continuous longitudinal seam. Subsequently, the opposed seam edges of each tube thus formed are weld united. The tubes are then arranged in closely spaced substantially parallel relation with the edges of adjacent fins of next adjacent tubes positioned contiguous to each other. Then the adjacent fins of next adjacent tubes are weld united to provide uninterrupted paths of thermal conductivity between the tubes and fins. This arrangement provides an economical gas-tight panel construction of relatively great rigidity.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

Of the drawings:

FIG. 1 shows a partial view of a solid tube wall;

FIG. 2 is a sectional view taken along the line 2—2 of FIG. 1;

FIG. 3 is a sectional view of a sheet metal strip formed with two bead-like reinforcements to produce a tube with two opposing longitudinal fins or ribs;

FIG. 4 is a sectional view of a modified sheet metal strip formed with three bead-like reinforcements to produce a tube with two opposing longitudinal fins;

FIG. 5 is a modified form of tube wall.

The tube panel of the invention comprises metallic tubes 10 having their longitudinal axes disposed in a common plane X—X and each formed with a pair of radially projecting generally diametrically opposed wedge-shaped fins 12 extending along the entire length of the corresponding tube, with adjacent fins of next adjacent tubes united along their entire lengths by welds 14 to provide a gas-tight panel.

With reference to FIG. 3, each tube of the panel of FIGS. 1 and 2 is provided by forming one surface of a metal strip 16 with a pair of outwardly projecting integral wedge-shaped fins or ribs 12 at positions spaced so that the fins will be generally diametrically opposed upon shaping the strip into tubular form. Below each fin 12 the opposite surface of the strip 16 is formed with an arc-shaped groove 18 to eliminate undue stresses in the metal of the corresponding rib 12 in the subsequent cylindrical deformation of the sheet metal strip. The width of each groove 18 corresponds to the base of the corresponding fin 12 and the radius $r$ of each groove coincides with the inside radius $r'$ of the tube upon shaping the strip into tubular form. The tube fins and grooves may be formed in one operation in known manner, such as by rolling, pressing, or upsetting. After the fins and grooves are provided the sheet metal strip is shaped in known manner to generally tubular form with the fins on the outside and the edges of the strip closely opposed in a continuous longitudinal seam 20, as shown in the right hand tube of FIG. 2 prior to the application of a seam weld. Then the opposed seam edges are united by welds 13 in known manner, such as by submerged arc welding, along their entire lengths. If the sheet metal strip 16 is profiled according to FIG. 3, the longitudinal seam 20 is located about half-way between the diametrically opposed fins 12.

In the FIG. 4 modification, the middle portion of strip 16 is formed with a rib and groove, while each of the edges are provided with a rib 12A and a groove 18A half the size of the corresponding parts of the middle portion of the strip so that upon shaping of the strip into tubular form the edge ribs cooperate to form a rib the size of the middle portion rib. Thus the seam and weld of FIG. 4 extend intermediate ribs 12A.

According to FIGS. 3 and 4, the mean distance between fins corresponds to half the tube circumference so that the longitudinal fins oppose each other diametrically in the finished tube. Tubes produced by the system of FIGS. 3 and 4 serve in the formation of a tube panel having all its tube fins disposed in a common plane. In a circular tube wall, such as that of FIG. 5, the ribs are arranged along a circular line y—y. Thus the ribs are not exactly diametrically opposed, as in FIG. 2.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. The method of making a tube comprising the steps of forming one surface of a metal strip with a pair of outwardly projecting integral wedge-shaped fins at positions spaced so that the fins will be generally diametrically opposed upon shaping the strip into tubular form, forming the opposite surface of the strip with an arc-shaped groove below the base of each fin, shaping the metal strip to generally tubular form with the fins on the outside and the edges of the strip closely opposed in a continuous longitudinal seam, and weld uniting the opposed seam edges the width of each groove corresponding to the width of the base of the associated fin and the radius of each groove corresponding to the inside radius of the finished tube.

2. The method of making a gas-tight tube panel composed of metal tubes, said method comprising the steps of forming one surface of a metal strip with a pair of outwardly projecting integral wedge-shaped fins at positions spaced so that the fins will be generally diametrically opposed upon shaping the strip into tubular form, forming the opposite surface of the strips with an arc-shaped groove below the base of each fin, shaping the metal strip to generally tubular form with the fins on the outside and the edges of the strip closely opposed in a continuous longitudinal seam, weld uniting the opposed seam edges, repeating the above tube forming steps with several metal strips, arranging the tubes thus formed in closely spaced substantially parallel relation while positioning adjacent fins of next adjacent tubes so that the edges of the adjacent fins are contiguous to each other, and then weld uniting adjacent fins and next adjacent fins to each other along substantially their entire lengths.

References Cited
UNITED STATES PATENTS

| | | | |
|---|---|---|---|
| 1,608,905 | 11/1923 | Hurray et al. | 29—157.3 |
| 1,858,512 | 5/1932 | Langenburg et al. | 113—118 |
| 2,278,155 | 3/1942 | Steenstrup | 72—51 |
| 2,716,805 | 9/1955 | Reed | 29—157.3 |
| 3,168,777 | 2/1965 | De Ridder et al. | 29—157.3 |
| 3,173,196 | 3/1965 | Grimm | 29—157.3 |
| 3,208,132 | 9/1965 | Escher | 29—157.3 X |

JOHN F. CAMPBELL, *Primary Examiner.*

P. M. COHEN, *Assistant Examiner.*